US010187658B2

(12) United States Patent
Lee et al.

(10) Patent No.: US 10,187,658 B2
(45) Date of Patent: Jan. 22, 2019

(54) METHOD AND DEVICE FOR PROCESSING MULTI-VIEW VIDEO SIGNAL

(71) Applicant: KT CORPORATION, Gyeonggi-do (KR)

(72) Inventors: Bae Keun Lee, Seoul (KR); Joo Young Kim, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 63 days.

(21) Appl. No.: 15/322,200

(22) PCT Filed: Jul. 2, 2015

(86) PCT No.: PCT/KR2015/006797
§ 371 (c)(1),
(2) Date: Dec. 27, 2016

(87) PCT Pub. No.: WO2016/003209
PCT Pub. Date: Jan. 7, 2016

(65) Prior Publication Data
US 2017/0142443 A1    May 18, 2017

(30) Foreign Application Priority Data

Jul. 3, 2014    (KR) .................. 10-2014-0083343

(51) Int. Cl.
*H04N 19/597*    (2014.01)
*H04N 19/159*    (2014.01)
(Continued)

(52) U.S. Cl.
CPC ......... *H04N 19/597* (2014.11); *H04N 19/119* (2014.11); *H04N 19/136* (2014.11);
(Continued)

(58) Field of Classification Search
CPC .. H04N 19/597; H04N 19/513; H04N 19/176; H04N 19/91; H04N 19/159
See application file for complete search history.

(56) References Cited

U.S. PATENT DOCUMENTS

2013/0142259 A1    6/2013  Lim et al.
2013/0229485 A1    9/2013  Rusanovskyy et al.
(Continued)

FOREIGN PATENT DOCUMENTS

KR    10-2012-0068743 A    6/2012
KR    10-2013-0038360 A    4/2013
(Continued)

OTHER PUBLICATIONS

Fabian Jager, "Depth-based Block Partitioning for 3D Video Coding", Picture Coding Symposium (PCS), Dec. 11, 2013, pp. 410-413.

*Primary Examiner* — Zhihan Zhou
(74) *Attorney, Agent, or Firm* — IP Legal Services, LLC (57) ABSTRACT

The present invention provides a method and apparatus for processing a multi-view video signal, the method including: determining a prediction mode of a current depth block; determining a partition mode of the current texture block when the current texture block is a block encoded in an inter mode; obtaining a motion vector of each partition based on the partition mode; and performing inter prediction on the current texture block by using the motion vector through depth-based.

12 Claims, 6 Drawing Sheets

(51) Int. Cl.
*H04N 19/176* (2014.01)
*H04N 19/513* (2014.01)
*H04N 19/91* (2014.01)
*H04N 19/119* (2014.01)
*H04N 19/136* (2014.01)

(52) U.S. Cl.
CPC ......... *H04N 19/159* (2014.11); *H04N 19/176* (2014.11); *H04N 19/513* (2014.11); *H04N 19/91* (2014.11)

(56) References Cited

U.S. PATENT DOCUMENTS

2013/0243088 A1 9/2013 Lim et al.
2015/0098508 A1* 4/2015 Yie ..................... H04N 19/597
375/240.16

FOREIGN PATENT DOCUMENTS

KR 10-2013-0079261 A 7/2013
WO 2013/030456 A1 3/2013

* cited by examiner

| coding_unit(x0,y0,log2CbSize,ctDepth){ | Descriptor |
|---|---|
| ... | |
| if(depth_based_blk_part_flag[nuh_layer_id] && CuPredMode[x0][y0] == MODE_INTER && PartMode!=PART_2Nx2N) | |
|     dbbp_flag[x0][y0] | ae(v) |
| ... | |
| } | |

S800 points to the dbbp_flag[x0][y0] row.

FIG. 9

| coding_unit(x0,y0,log2CbSize,ctDepth){ | Descriptor |
|---|---|
| ... | |
| if(depth_based_blk_part_flag[nuh_layer_id] && CuPredMode[x0][y0] == MODE_INTER && (PartMode != PART_2Nx2N \|\| PartMode != PART_NxN)) | |
|     dbbp_flag[x0][y0] | ae(v) |
| ... | |
| } | |

S900 points to the dbbp_flag[x0][y0] row.

METHOD AND DEVICE FOR PROCESSING MULTI-VIEW VIDEO SIGNAL

CROSS REFERENCE TO RELATED APPLICATIONS

This application is a National Stage Patent Application of PCT International Patent Application No. PCT/KR2015/006797 (filed on Jul. 2, 2015) under 35 U.S.C. § 371, which claims priority to Korean Patent Application No. 10-2014-0083343 (filed on Jul. 3, 2014), the teachings of which are incorporated herein in their entireties by reference.

TECHNICAL FIELD

The present invention relates to a method and device for coding a video signal.

BACKGROUND ART

Recently, demands for high-resolution and high-quality images such as high definition (HD) images and ultra high definition (UHD) images, have increased in various application fields. However, higher resolution and quality images have increasing amounts of image data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image compression techniques may be utilized.

Video compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

In encoding/decoding a multi-view video signal, the present invention is intended to propose a method and apparatus for performing inter-view prediction by using a disparity vector.

In encoding/decoding a multi-view video signal, the present invention is intended to propose a method and apparatus for deriving a disparity vector of a texture block by using depth data of a depth block.

In encoding/decoding a multi-view video signal, the present invention is intended to propose a method and apparatus for deriving a disparity vector from a neighboring block of a current texture block.

In encoding/decoding a multi-view video signal, the present invention is intended to propose a method and apparatus for inter prediction through depth-based block partitioning.

Technical Solution

The present invention provides a method and apparatus for decoding a multi-layer video signal, the method including: determining a prediction mode of a current depth block; determining a partition mode of the current texture block when the current texture block is a block encoded in an inter mode; obtaining a motion vector of each partition based on the partition mode; and performing inter prediction on the current texture block by using the motion vector through depth-based block partitioning.

In the method and apparatus for decoding the multi-layer video signal according to the present invention, the performing of inter prediction may include: generating a first prediction block of the current texture block by using a motion vector of a first partition of the current texture block, and generating a second prediction block of the current texture block by using a motion vector of a second partition of the current texture block; and generating a final prediction block by combining the first prediction block and the second prediction block depending on a partition pattern of a depth block relative to the current texture block.

In the method and apparatus for decoding the multi-layer video signal according to the present invention, the partition pattern of the depth block may be divided into a first region and a second region on the basis of comparison between a reconstructed depth value of the depth block and a predetermined threshold value.

In the method and apparatus for decoding the multi-layer video signal according to the present invention, the predetermined threshold value may be an average value of samples positioned at a corner of the depth block, the first region may be a region composed of samples having depth values larger than the predetermined threshold value, and the second region may be a region composed of samples having depth values smaller than the predetermined threshold value.

In the method and apparatus for decoding the multi-layer video signal according to the present invention, the performing of inter prediction on the current texture block may be selectively performed on the basis of a depth block partitioning flag.

In the method and apparatus for decoding the multi-layer video signal according to the present invention, the depth block partitioning flag may be signaled when the partition mode of the current texture block is not a 2N×2N mode or an N×N mode.

The present invention provides a method and apparatus for encoding a multi-layer video signal, the method including: encoding a prediction mode of a current depth block; encoding a partition mode of the current texture block when the current texture block is a block encoded in an inter mode; obtaining a motion vector of each partition based on the partition mode; and performing inter prediction on the current texture block by using the motion vector through depth-based block partitioning.

In the method and apparatus for encoding the multi-layer video signal according to the present invention, the performing of inter prediction may include: generating a first prediction block of the current texture block by using a motion vector of a first partition of the current texture block, and generating a second prediction block of the current texture block by using a motion vector of a second partition of the current texture block; and generating a final prediction block by combining the first prediction block and the second prediction block depending on a partition pattern of a depth block relative to the current texture block.

In the method and apparatus for encoding the multi-layer video signal according to the present invention, the partition pattern of the depth block may be divided into a first region and a second region on the basis of comparison between a reconstructed depth value of the depth block and a predetermined threshold value.

In the method and apparatus for encoding the multi-layer video signal according to the present invention, the predetermined threshold value may be an average value of samples positioned at a corner of the depth block, the first region may be a region composed of samples having depth values larger than the predetermined threshold value, and the second region may be a region composed of samples having depth values smaller than the predetermined threshold value.

In the method and apparatus for encoding the multi-layer video signal according to the present invention, the performing of inter prediction on the current texture block may be selectively performed on the basis of a depth block partitioning flag.

In the method and apparatus for encoding the multi-layer video signal according to the present invention, the depth block partitioning flag may be encoded when the partition mode of the current texture block is not a 2N×2N mode or an N×N mode.

Advantageous Effects

According to the present invention, it is possible to effectively perform inter-view prediction by using the disparity vector.

According to the present invention, it is possible to effectively derive the disparity vector of the current texture block from depth data of the current depth block or from a disparity vector of a neighboring texture block.

According to the present invention, it is possible to enhance efficiency of inter prediction by using depth-based block partitioning.

BEST MODE

The present invention provides a method and apparatus for decoding a multi-layer video signal, the method including: determining a prediction mode of a current depth block; determining a partition mode of the current texture block when the current texture block is a block encoded in an inter mode; obtaining a motion vector of each partition based on the partition mode; and performing inter prediction on the current texture block by using the motion vector through depth-based block partitioning.

In the method and apparatus for decoding the multi-layer video signal according to the present invention, the performing of inter prediction may include: generating a first prediction block of the current texture block by using a motion vector of a first partition of the current texture block, and generating a second prediction block of the current texture block by using a motion vector of a second partition of the current texture block; and generating a final prediction block by combining the first prediction block and the second prediction block depending on a partition pattern of a depth block relative to the current texture block.

In the method and apparatus for decoding the multi-layer video signal according to the present invention, the partition pattern of the depth block may be divided into a first region and a second region on the basis of comparison between a reconstructed depth value of the depth block and a predetermined threshold value.

In the method and apparatus for decoding the multi-layer video signal according to the present invention, the predetermined threshold value may be an average value of samples positioned at a corner of the depth block, the first region may be a region composed of samples having depth values larger than the predetermined threshold value, and the second region may be a region composed of samples having depth values smaller than the predetermined threshold value.

In the method and apparatus for decoding the multi-layer video signal according to the present invention, the performing of inter prediction on the current texture block may be selectively performed on the basis of a depth block partitioning flag.

In the method and apparatus for decoding the multi-layer video signal according to the present invention, the depth block partitioning flag may be signaled when the partition mode of the current texture block is not a 2N×2N mode or an N×N mode.

The present invention provides a method and apparatus for encoding a multi-layer video signal, the method including: encoding a prediction mode of a current depth block; encoding a partition mode of the current texture block when the current texture block is a block encoded in an inter mode; obtaining a motion vector of each partition based on the partition mode; and performing inter prediction on the current texture block by using the motion vector through depth-based block partitioning.

In the method and apparatus for encoding the multi-layer video signal according to the present invention, the performing of inter prediction may include: generating a first prediction block of the current texture block by using a motion vector of a first partition of the current texture block, and generating a second prediction block of the current texture block by using a motion vector of a second partition of the current texture block; and generating a final prediction block by combining the first prediction block and the second prediction block depending on a partition pattern of a depth block relative to the current texture block.

In the method and apparatus for encoding the multi-layer video signal according to the present invention, the partition pattern of the depth block may be divided into a first region and a second region on the basis of comparison between a reconstructed depth value of the depth block and a predetermined threshold value, In the method and apparatus for encoding the multi-layer video signal according to the present invention, the predetermined threshold value may be an average value of samples positioned at a corner of the depth block, the first region may be a region composed of samples having depth values larger than the predetermined threshold value, and the second region may be a region composed of samples having depth values smaller than the predetermined threshold value.

In the method and apparatus for encoding the multi-layer video signal according to the present invention, the performing of inter prediction on the current texture block may be selectively performed on the basis of a depth block partitioning flag.

In the method and apparatus for encoding the multi-layer video signal according to the present invention, the depth block partitioning flag may be encoded when the partition mode of the current texture block is not a 2N×2N mode or an N×N mode.

Mode for Invention

A technique for encoding or decoding multi-view video signal data considers spatial redundancy, temporal redundancy, and inter-view redundancy. In addition, in the case of a multi-view image, multi-view texture images captured at two or more views may be coded in order to obtain a three-dimensional image. Furthermore, depth data relative to the multi-view texture images may be coded as necessary. The depth data may be coded in consideration of spatial redundancy, temporal redundancy, or inter-view redundancy. Depth data is information of distance between a camera and a relevant pixel. The depth data may be flexibly interpreted as depth related information such as a depth value, depth information, a depth image, a depth picture, a depth sequence, a depth bitstream, etc. in the description. In addition, coding may include the concepts of encoding and decoding in the description, and may be flexibly interpreted within the technical spirit and technical scope of the present invention.

Figure 1:
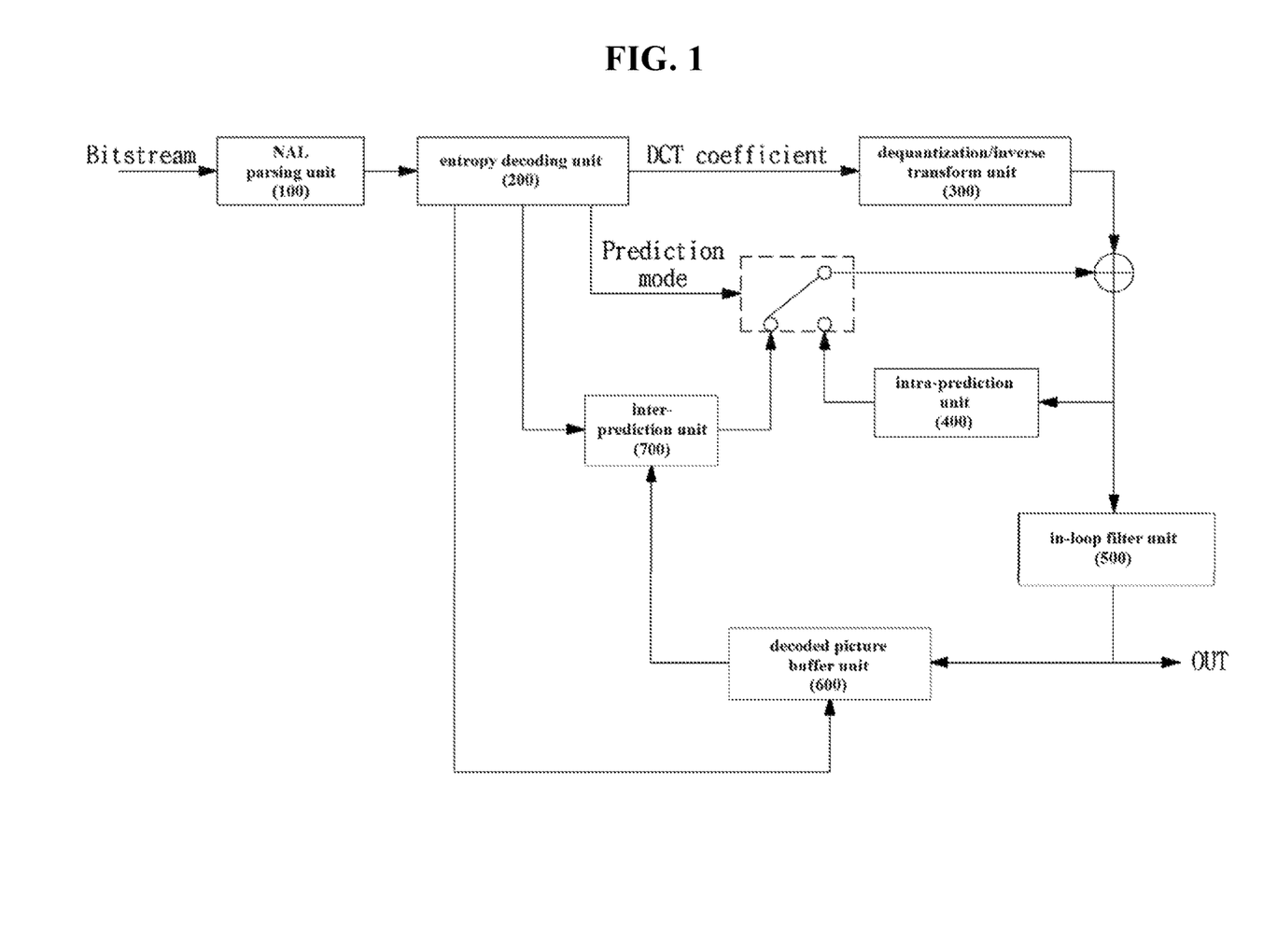
FIG. 1 is a block diagram showing a video decoder according to an embodiment of the present invention.

FIG. 1 is a block diagram showing a video decoder according to an embodiment of the present invention.

Referring to FIG. 1, a video decoder may include an NAL parsing unit 100, an entropy decoding unit 200, a dequantization/inverse transform unit 300, an intra-prediction unit 400, an in-loop filter unit 500, a decoded picture buffer unit 600, and an inter-prediction unit 700.

The NAL parsing unit 100 may receive a bitstream including multi-view texture data. In addition, when depth data is required to code texture data, a bitstream including encoded depth data may be received. Here, texture data and depth data that are input may be transmitted in one bitstream, or may be transmitted in respective bitstreams. The NAL parsing unit 100 may perform parsing for each NAL in order to decode an input bitstream. When an input bitstream is multi-view related data (for example, a three-dimensional video), the input bitstream may include a camera parameter. The camera parameter may include an intrinsic camera parameter and an extrinsic camera parameter. The intrinsic camera parameter may include a focal length, an aspect ratio, a principal point, etc., and the extrinsic camera parameter may include position information of a camera in a world coordinate system, etc.

The entropy decoding unit 200 may extract a quantized transform coefficient, coding information for prediction of a texture picture, etc. through entropy decoding.

The dequantization/inverse transform unit 300 may obtain a transform coefficient by applying a quantization parameter to the quantized transform coefficient, and may decode texture data or depth data by performing inverse transform on the transform coefficient. Here, the decoded texture data or depth data may be residual data based on prediction processing. In addition, a quantization parameter relative to a depth block may be set in consideration of complexity of texture data. For example, when a texture block relative to a depth block is a region having high complexity, a low quantization parameter may be set. When a texture block relative to a depth block is a region having low complexity, a high quantization parameter may be set. The complexity of the texture block may be determined on the basis of a residual value between pixels that are adjacent to each other in a reconstructed texture picture, as represented by Equation 1.

Equation 1

$$E = \frac{1}{N}\sum_{(x,y)} [|C_{x,y} - C_{x-1,y}| + |C_{x,y} - C_{x+1,y}|]^2 \qquad \text{[Equation 1]}$$

In the equation 1, complexity of texture data may be denoted by E, reconstructed texture data may be denoted by C, the number of pixels in a region of texture data that is a target for calculating complexity may be denoted by N. Referring to the equation 1, the complexity of the texture data may be calculated by using a residual value between texture data corresponding to (x,y) position and texture data corresponding to (x−1,y) position, and a residual value between texture data corresponding to (x,y) position and texture data corresponding to (x+1,y) position. In addition, complexity may be respectively calculated relative to a texture picture and a texture block, and by using this, a quantization parameter may be derived as represented by Equation 2.

Equation 2

$$\Delta QP = \min\left(\max\left(\alpha \log_2 \frac{E_f}{E_b}, -\beta\right), \beta\right) \qquad \text{[Equation 2]}$$

Referring to the equation 2, a quantization parameter of a depth block may be determined on the basis of the ratio of complexity of a texture picture to complexity of a texture block. A variable integer derived from a decoder may be denoted by α and β, or an integer predetermined by a decoder may be denoted by α and β.

The intra-prediction unit 400 may perform intra prediction by using a reconstructed texture data in a current texture picture. Intra prediction may be performed on a depth picture in the same manner as on a texture picture. For example, coding information used for intra prediction of a texture picture may also be used for intra prediction of a depth picture. Here, the coding information used for intra prediction may include an intra-prediction mode and partition information of intra prediction.

The in-loop filter unit 500 may apply an in-loop filter to each of encoded blocks in order to reduce a block distortion effect. A filter may enhance definition of a decoded picture by softening the edge of a block. A filtered texture picture or a filtered depth picture may be outputted, or may be stored in the decoded picture buffer unit 600 so as to be used as a reference picture. In the meantime, characteristics of texture data and of depth data are different from each other. Therefore, when texture data and depth data are encoded by using the same in-loop filter, coding efficiency may decrease. Accordingly, a separate in-loop filter for depth data may be defined. Hereinafter, as an in-loop filtering method for effectively coding depth data, a region-based adaptive loop filter and a trilateral loop filter will be described.

In the case of a region-based adaptive loop filter, whether or not a region-based adaptive loop filter is applied may be determined on the basis of variance of a depth block. Here, the variance of a depth block may be determined as a residual value between the maximum pixel value and the minimum pixel value in the depth block. Whether or not the filter is applied may be determined by comparing the variance of the depth block with a predetermined threshold value. For example, when variance of a depth block is equal to or greater than a predetermined threshold value, a residual value between the maximum pixel value and the minimum pixel value in the depth block is large, and thus, a region-based adaptive loop filter may be applied. In contrast, when variance of a depth block is less than a predetermined threshold value, a region-based adaptive loop filter may not be applied. When applying the filter depending on the comparison result, a pixel value of a filtered depth block may be derived by applying a predetermined weighting to a neighboring pixel value. Here, the predetermined weighting may be determined on the basis of a position difference between a current filtering target pixel and a neighboring pixel and/or of a residual value between a current filtering target pixel value and a neighboring pixel value. In addition, the neighboring pixel value may be one of pixel values included in a depth block except a pixel value being currently filtered.

According to the present invention, a trilateral loop filter and the region-based adaptive loop filter are similar to each other, but different from each other in terms of considering texture data. Specifically, a trilateral loop filter compares the following three conditions, and may derive depth data of a neighboring pixel that satisfies the conditions.

$|p-q| \leq \sigma 1$  Condition 1.

$|D(p)-D(q)| \leq \sigma 2$  Condition 2.

$|V(p)-V(q)| \leq \sigma 3$  Condition 3.

Condition 1 is comparing a σ1 with a position difference between a current pixel (p) and a neighboring pixel (q) in a depth block, Condition 2 is comparing a predetermined parameter σ2 with a residual value between depth data of a current pixel (p) and depth data of a neighboring pixel (q), and Condition 3 is considering a predetermined parameter σ3 with a residual value between texture data of a current pixel (p) and texture data of a neighboring pixel (q).

Neighboring pixels that satisfy the three conditions are extracted, and a median value or an average value of depth data of the neighboring pixels may be used to filter a current pixel (p).

The decoded picture buffer unit 600 stores or opens a previously coded texture picture or depth picture in order to perform inter prediction. Here, in order to be stored or opened in the decoded picture buffer unit 600, frame_num of each picture and picture order count (POC) may be used. Furthermore, in performing depth coding, the previously coded pictures include depth pictures of views different from a view of a current depth picture. Therefore, in order to use the pictures as reference pictures, view identification information identifying a view of a depth picture may be used. In order to more flexibly perform inter prediction, the decoded picture buffer unit 600 may manage a reference picture by using a memory management control operation method, a sliding window method, etc. This is intended for integrating a memory of a reference picture and a memory of a non-reference picture into a single memory and efficiently managing the reference picture and the non-reference picture with a small memory. In performing depth coding, depth pictures may be marked with a separate indication to be distinguished from texture pictures in the decoded picture buffer unit. Information for identifying each depth picture may be used in the marking process.

The inter-prediction unit 700 may perform motion compensation on a current block by using a reference picture and motion information that are stored in the decoded picture buffer unit 600. In the specification, the motion information may include a motion vector and reference index information in a broad sense. In addition, the inter-prediction unit 700 may perform temporal inter prediction in order to perform motion compensation. The temporal inter prediction may be inter prediction using both motion information of a current texture block and a reference picture that is positioned at the same view as the current texture block and has a different time period from the current texture block. In addition, in the case of a multi-view image captured by a plurality of cameras, temporal inter prediction as well as inter-view prediction may be performed. Motion information used for the inter-view prediction may include a disparity vector or an inter-view motion vector. A method of performing inter-view prediction by using the disparity vector will be described with reference to FIG. 2.

Figure 2:
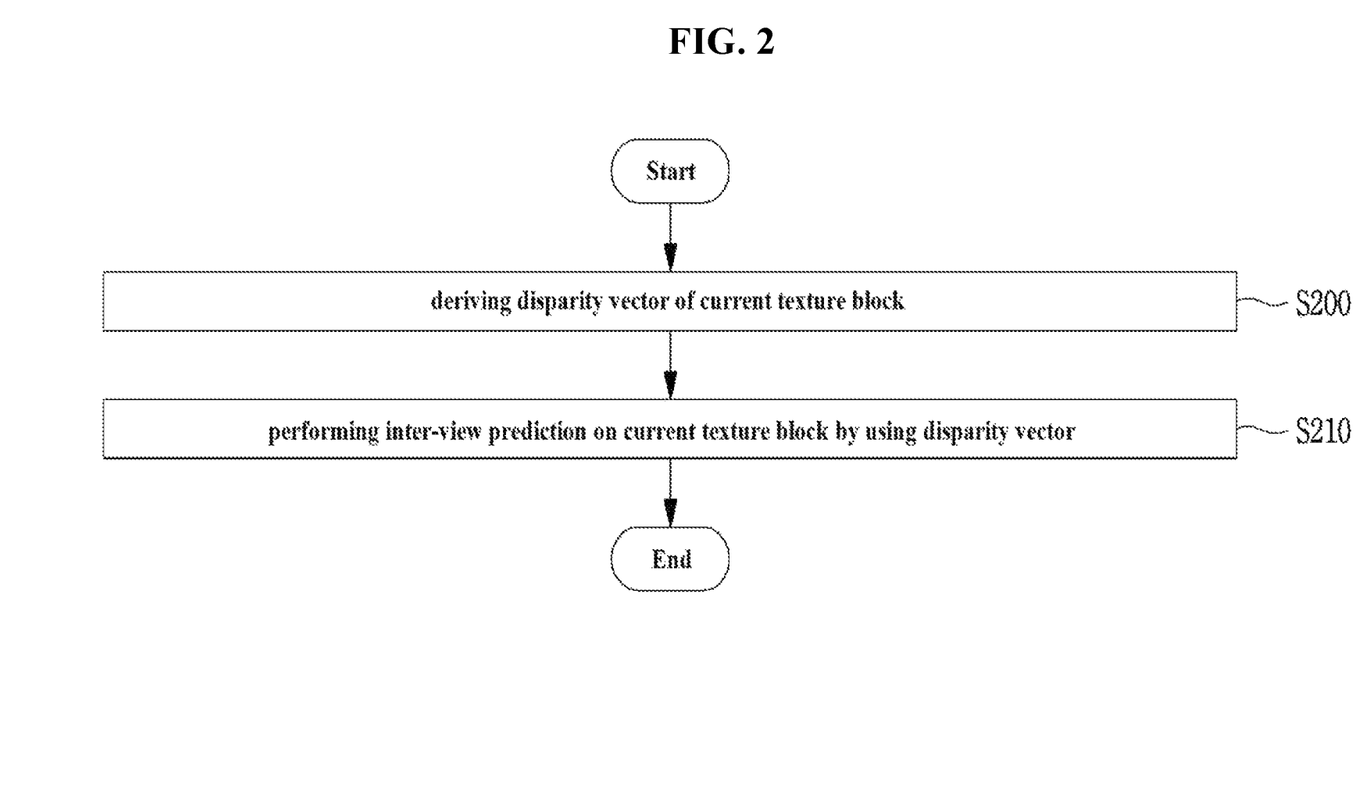
FIG. 2 is a view showing a method of performing inter-view prediction on the basis of a disparity vector according to an embodiment of the present invention.

FIG. 2 is a view showing a method of performing inter-view prediction on the basis of a disparity vector according to an embodiment of the present invention.

Referring to FIG. 2, a disparity vector of a current texture block may be derived at step S200.

For example, a disparity vector may be derived from a depth image relative to a current texture block, and this will be described in detail with reference to FIG. 3.

In addition, a disparity vector may be derived from a neighboring block spatially adjacent to the current texture block, and may be derived from a temporal neighboring block that is positioned at a time period different from that of the current texture block. A method of deriving a disparity vector from spatial/temporal neighboring block of a current texture block will be described with reference to FIG. 4.

Referring to FIG. 2, by using the disparity vector derived at step S200, inter-view prediction may be performed on the current texture block at step S210.

For example, texture data of the current texture block may be predicted or reconstructed by using texture data of a reference block specified by the disparity vector. Here, the reference block may be related to a view used for inter-view prediction of a current texture block, namely, to a reference view. The reference block may be included in a reference picture positioned at the same time period as a current texture block.

In addition, the disparity vector may be used to specify a reference block related to a reference view. A temporal motion vector of a current texture block may be derived by using a temporal motion vector of the specified reference block. Here, a temporal motion vector is a motion vector used for temporal inter prediction, and may be distinguished from a disparity vector used for inter-view prediction.

Figure 3:
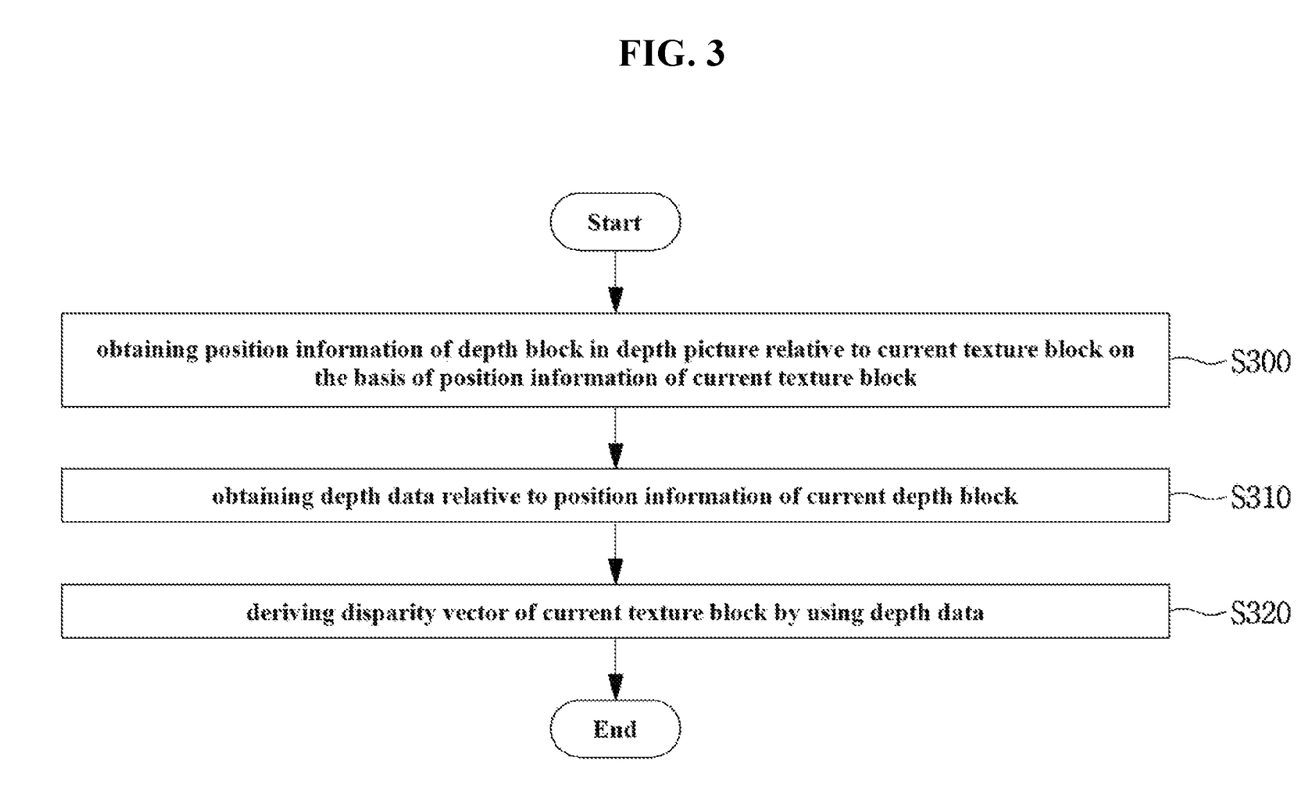
FIG. 3 is a view showing a method of deriving a disparity vector of a current texture block by using depth data of a depth image according to an embodiment of the present invention.

FIG. 3 is a view showing a method of deriving a disparity vector of a current texture block by using depth data of a depth image according to an embodiment of the present invention.

Referring to FIG. 3, position information of a depth block (hereinafter, referred to as a current depth block) in a depth picture relative to a current texture block may be obtained on the basis of position information of the current texture block at step S300.

A position of the current depth block may be determined in consideration of spatial resolution between a depth picture and a current picture.

For example, when a depth picture and a current picture are coded with the same spatial resolution, a position of a current depth block may be determined as a block having the same position as a current texture block of the current picture. In the meantime, a current picture and a depth picture may be coded with different spatial resolution. Due to the characteristics of depth information indicating distance information between a camera and an object, coding efficiency may not largely decrease in spite of coding with low spatial resolution. Therefore, when spatial resolution of a depth picture is coded lower than that of a current picture, a decoder may perform up-sampling on a depth picture in advance of obtaining position information of a current depth block. In addition, when the aspect ratio of the up-sampled depth picture and the aspect ratio of a current picture are different from each other, offset information may be considered in obtaining position information of a current depth block in the up-scaled depth picture. Here, the offset information may include at least one of upper offset information, left offset information, right offset information, and lower offset information. The upper offset information may indicate position difference between at least one pixel positioned at the upper end of the up-sampled depth picture and at least one pixel positioned at the upper end of a current picture. The left, right, lower offset information may be defined in the same manner as the upper offset information.

Referring to FIG. 3, depth data relative to position information of a current depth block may be obtained at step S310.

When a plurality of pixels exit in a current depth block, depth data relative to a corner pixel of the current depth block may be used. Alternatively, depth data relative to a center pixel of the current depth block may be used. Alternatively, among depth data relative to a plurality of pixels, one of the maximum value, the minimum value, and the most frequent value may be selectively used, or an average value of depth data may be used.

Referring to FIG. 3, by using the depth data obtained at step S310, a disparity vector of a current texture block may be derived at step S320.

For example, the disparity vector of the current texture block may be derived as represented by Equation 3.

Equation 3

$$DV=(a*v+f)>>n$$ [Equation 3]

Referring to Equation 3, depth data is denoted by v, a scaling vector is denoted by a, an offset used to derive a disparity vector is denoted by f. The scaling vector a and the offset f may be signaled at a video parameter set or at a slice header, or may be preset values at a decoder. A variable indicating a value of bit shift is denoted by n, and n may be variably determined depending on accuracy of a disparity vector.

Figure 4:
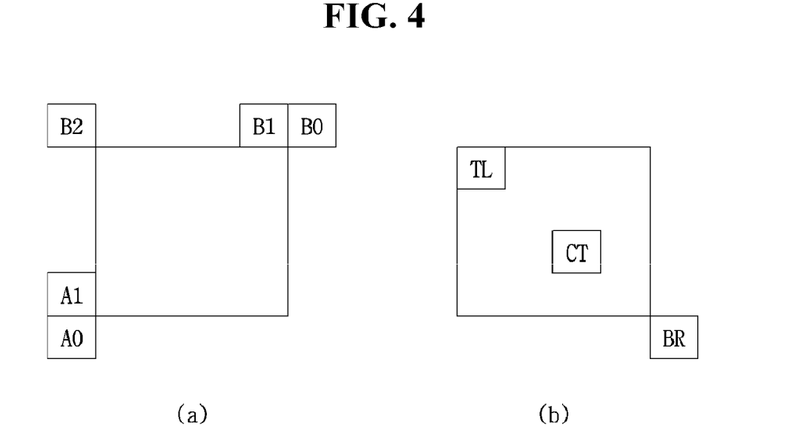
FIG. 4 is a view showing candidates of spatial/temporal neighboring blocks of a current texture block according to an embodiment of the present invention.

FIG. 4 is a view showing candidates of spatial/temporal neighboring blocks of a current texture block according to an embodiment of the present invention.

Referring to FIG. 4(a), a spatial neighboring block may include at least one of a left neighboring block (A1), an upper neighboring block (B1), a lower left neighboring block (A0), an upper right neighboring block (B0), and an upper left neighboring block (B2) of a current texture block.

Referring to FIG. 4(b), a temporal neighboring block may be a block positioned at the same position as a current texture block. Specifically, the temporal neighboring block is a block included in a picture having a different time period from the current texture block. The temporal neighboring block may include at least one of a block (BR) relative to a lower right pixel of a current texture block, a block (CT) relative to a center pixel of the current texture block, and a block (TL) relative to an upper left pixel of the current texture block.

A disparity vector of a current texture block may be derived from a disparity-compensated prediction block (hereinafter, referred to as a DCP block) among the spatial/temporal neighboring blocks. Here, the DCP block may be a block encoded through inter-view texture prediction using a disparity vector. In other words, the DCP block may perform inter-view prediction by using texture data of a reference block specified by a disparity vector. In this case, a disparity vector of a current texture block may be predicted or reconstructed by using a disparity vector that is used by the DCP block for inter-view texture prediction.

Alternatively, a disparity vector of a current texture block may be derived from a disparity vector based-motion compensation prediction block (hereinafter, referred to as a DV-MCP block) among the spatial neighboring blocks. Here, the DV-MCP block may be a block that is encoded through interview motion prediction using a disparity vector. In other words, the DV-MCP block may perform temporal inter prediction by using a temporal motion vector of a reference block that is specified by a disparity vector. In this case, a disparity vector of a current texture block may be predicted or reconstructed by using a disparity vector that is used by the DV-MCP block to obtain a temporal motion vector of a reference block.

The current texture block may explore whether spatial/temporal neighboring blocks are relevant to a DCP bock according to a predetermined priority order, and may derive a disparity vector from a DCP block that is firstly explored. For an example of the predetermined priority order, the exploration may be performed according to a priority order from a spatial neighboring block to a temporal neighboring block. Whether spatial neighboring blocks are relevant to a DCP bock may be explored according to a priority order of A1→B1→B0→A0→B2. However, it is only an embodiment of a priority order, and the priority order may be variously determined within the range that is obvious to those of ordinary skill in the art.

When any one of the spatial/temporal neighboring blocks is not relevant to the DCP block, whether a relevant spatial neighboring block is relevant to a DV-MCP block may be explored, and a disparity vector may be derived from a DV-MCP block that is firstly explored.

Figure 5:
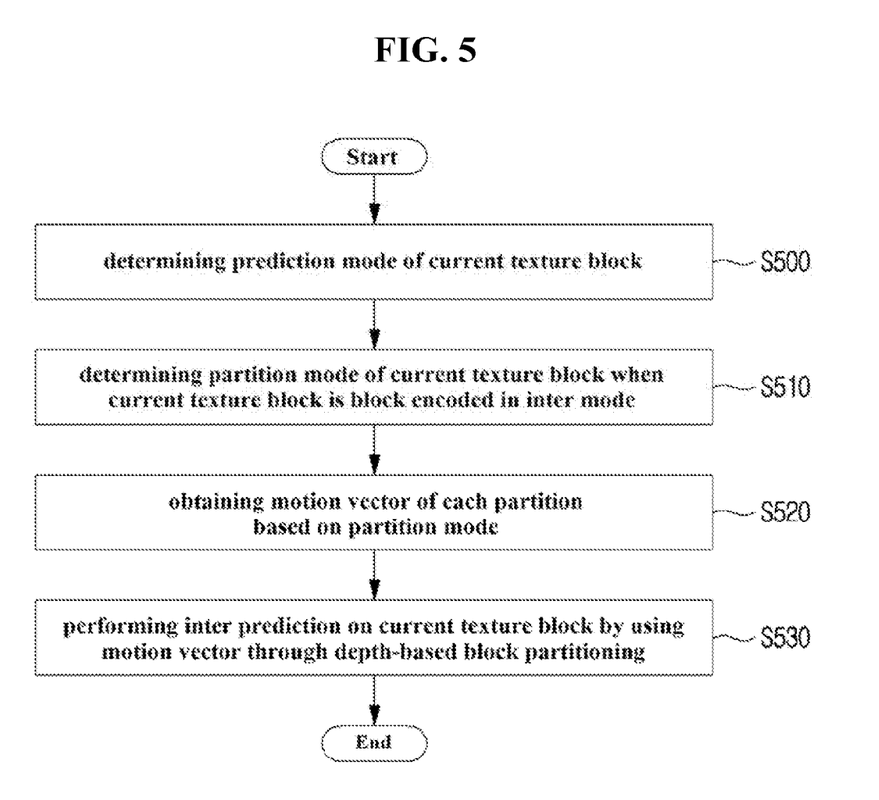
FIG. 5 is a view showing a method of performing inter prediction of a current texture block according to an embodiment of the present invention.

FIG. 5 is a view showing a method of performing inter prediction of a current texture block according to an embodiment of the present invention.

Referring to FIG. 5, a prediction mode of a current texture block may be determined at step S500.

That is, whether a current texture block is a block encoded in an intra mode or in an inter mode may be determined. A prediction mode of a current texture block may be determined by using a prediction mode flag that is transmitted by being encoded at an encoding apparatus. For example, when a flag value of the prediction mode is 0, a current texture block is a block encoded in an inter mode. When a flag value of the prediction mode is 1, a current texture block is a block encoded in an intra mode.

Referring to FIG. 5, when the current texture block is a block encoded in an inter mode, a partition mode of the current texture block may be determined at step S510.

According to the present invention, a partition mode may specify whether a current texture block is encoded in square shape partition or in rectangular shape partition, and may specify whether a current texture block is encoded in symmetrical shape partition or in asymmetrical shape partition. For example, a partition mode includes a 2N×2N mode, an N×2N mode, a 2N×N mode, an N×N mode, a 2N×nU mode, a 2N×nD mode, an nL×2N mode, an nR×2N mode, etc. Depending on the partition mode, a current texture block may be partitioned into at least one partition. Depending on the partition mode, a basis unit (namely, a unit of prediction) performing inter prediction on a current texture block may be determined. A partition mode of a current texture block may be determined by using partition mode information (part_mode) that is transmitted by being encoded at an encoding apparatus.

Referring to FIG. 5, for each partition based on the partition mode determined at step S510, a motion vector may be obtained at step S520.

Specifically, each partition of a current texture block may obtain a motion vector prediction value by using a motion vector of a spatial neighboring block or of a temporal neighboring block, and may reconstruct a motion vector by using the motion vector prediction value and an encoded motion vector residual value. Here, the spatial neighboring block may be a neighboring block adjacent to the upper end or the left side of the partition. The temporal neighboring block may be a block that is in a picture having a different time period from a current texture block and is positioned at the same position as the current texture block.

Referring to FIG. 5, inter prediction may be performed on a current texture block by using the motion vector through depth-based block partitioning at step S530.

According to the present invention, depth-based block partitioning is a method of generating a plurality of prediction blocks by using different motion vectors of plural partitions based on a partition mode of a current texture block, and of generating a final prediction block by combining the plurality of prediction blocks depending on a partition pattern of a depth block, and the method will be described in detail with reference to FIG. 6.

In addition, inter prediction using depth-based block partitioning may be selectively performed on the basis of a depth block partitioning flag. For example, when a value of the depth block partitioning flag is 1, a current texture block may perform inter prediction by using depth-based block partitioning. When a value of the depth block partitioning flag is 0, a current texture block may indicate that depth-based block partitioning is not used. A method of signaling the depth block partitioning flag will be described with reference to FIGS. 7 to 9.

When a current texture block or each partition of the current texture block performs bidirectional prediction, inter prediction using the depth-based block partitioning may not be performed.

Figure 6:
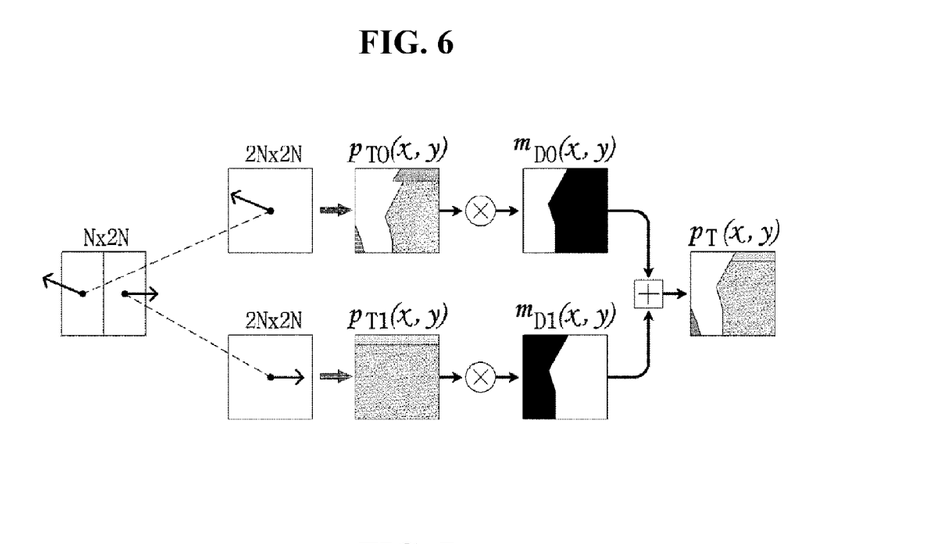
FIG. 6 is a view showing a method of performing inter prediction by using depth-based block partitioning according to an embodiment of the present invention.

FIG. 6 is a view showing a method of performing inter prediction by using depth-based block partitioning according to an embodiment of the present invention.

Referring to FIG. 6, a first prediction block ($P_{T0}(x,y)$) of a current texture block may be generated by using a motion vector of a first partition.

Specifically, when a current texture block is encoded in an N×2N partition mode, the first partition may be one of the left partition (for example, a partition having a partition index is 0) and the right partition (for example, a partition having a partition index is 1) of a current texture block. Alternatively, when a current texture block is encoded in a 2N×N partition mode, the first partition may be one of the upper partition and the lower partition.

Inter prediction may be performed by applying a motion vector relative to the first partition to the current texture block. The first prediction block ($P_{T0}(x,y)$) may have the same size as a current texture block, namely, the size of 2N×2N.

Referring to FIG. 6, a second prediction block ($P_{T1}(x,y)$) of a current texture block may be generated by using a motion vector of a second partition.

Here, the second partition is a partition included in a current texture block, and may be different from the first partition. When inter prediction is performed by applying a motion vector relative to the second partition to the current texture block, a second prediction block ($P_{T1}(x,y)$) may have the same size as a current texture block, namely, the size of 2N×2N.

A final prediction block (($P_T(x,y)$)) may be generated by combining the first prediction block ($P_{T0}(x,y)$) and the second prediction block ($P_{T1}(x,y)$) depending on a partition pattern of a depth block relative to a current texture block.

Specifically, the partition pattern of the depth block may be determined on the basis of the comparison between a reconstructed depth value of a depth block and a predetermined threshold value. The predetermined threshold value may be determined as a value of one of samples positioned at the corner of the depth block, and may be determined as an average value, the most frequent value, the minimum value, the maximum value, etc. of the samples positioned at the corner. The samples positioned at the corner of the depth block may include at least two of an upper left corner sample, an upper right corner sample, a lower left corner sample, and a lower right corner sample.

Through the comparison between a reconstructed depth value of a depth block and a predetermined threshold value, the depth block may be divided into a first region and a second region. The first region may be a collection of samples having depth values larger than the predetermined threshold value, and the second region may be a collection of samples having depth values smaller than the predetermined threshold value. In order to distinguish the first region and the second region, 1 may be assigned to a sample of the first region, and 0 may be assigned to a sample of the second region. Inversely, 0 may be assigned to a sample of the first region, and 1 may be assigned to a sample of the second region. A partition pattern may be determined by dividing the depth block into the first region and the second region.

A prediction signal (hereinafter, referred to as a first prediction signal ($m_{D0}(x,y)$)) relative to the first region based on the partition pattern may be extracted from the first prediction block ($P_{T0}(x,y)$). A prediction signal (hereinafter, referred to as a second prediction signal ($m_{D1}(x,y)$)) relative to the second region based on the partition pattern may be extracted from the second prediction block ($P_{T1}(x,y)$).

A final prediction block of a current texture block may be generated by combining the extracted first prediction signal ($m_{D0}(x,y)$) and second prediction signal ($m_{D1}(x,y)$).

Figure 7:
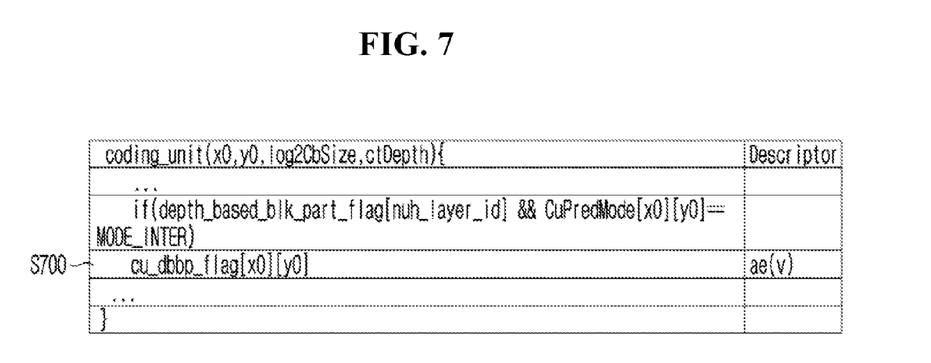
FIGS. 7 to 9 are views showing a method of signaling a depth block partitioning flag according to an embodiment of the present invention.
Figure 8:
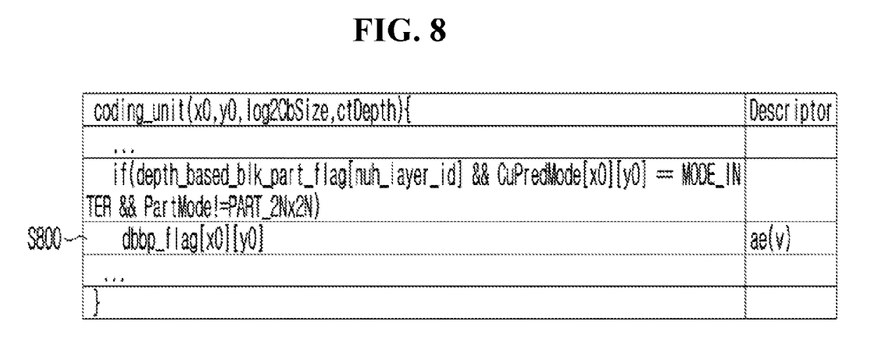
Figure 9:
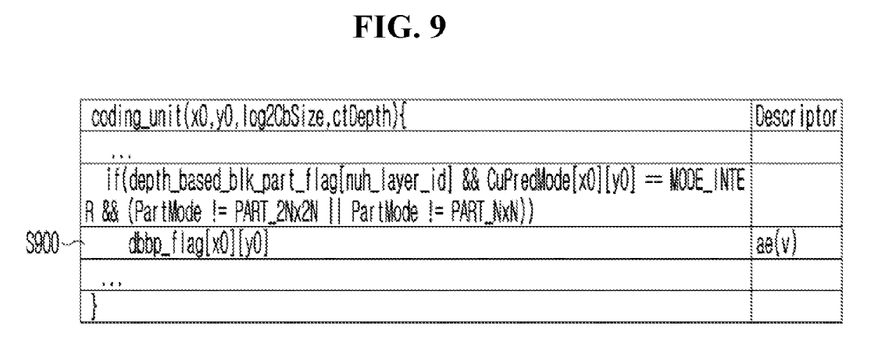

FIGS. 7 to 9 are views showing a method of signaling a depth block partitioning flag according to an embodiment of the present invention.

Referring to FIG. 7, a depth block partitioning flag may be obtained on the basis of a depth block partitioning availability flag (depth_based_blk_part_flag[layerId]) and a prediction mode of a current texture block at step S700.

The depth block partitioning availability flag may indicate whether or not depth-based block partitioning is used in at least one slice or coding block related to a layer ID layerId. For example, when a value of a depth block partitioning availability flag is 1, depth-based block partitioning may be used in at least one slice or coding block related to a relevant layer. When a value of a depth block partitioning availability flag is 0, depth-based block partitioning may not be used in all slices or coding blocks related to a relevant layer. Accordingly, only when a value of a depth block partitioning availability flag is 1, a depth block partitioning flag may be obtained.

In the meantime, depth-based block partitioning is a method of generating prediction signals by respectively using different motion vectors of one coding block, and of composing the generated prediction signals on the basis of a partition pattern of a depth block. Therefore, depth-based block partitioning may not be used when a prediction mode of a coding block is an intra mode, or in a skip mode performed for each coding block. Accordingly, only when a prediction mode of a current texture block is an inter mode, a depth block partitioning flag may be obtained, thereby enhancing coding efficiency.

Referring to FIG. 8, a depth block partitioning flag may be obtained on the basis of a depth block partitioning availability flag (depth_based_blk_part_flag[layerId], a prediction mode of a current texture block, and a partition mode of the current texture block at step S800.

As described above, the depth block partitioning availability flag may indicate whether or not depth-based block partitioning is used in at least one slice or coding block related to a layer ID layerId. For example, when a value of a depth block partitioning availability flag is 1, depth-based block partitioning is used in at least one slice or coding block related to a relevant layer. When a value of a depth block partitioning availability flag is 0, depth-based block partitioning may not be used in all slices or coding blocks related to a relevant layer. Accordingly, only when a value of a depth block partitioning availability flag is 1, a depth block partitioning flag may be obtained.

In the meantime, in the same manner as shown in FIG. 7, only when a prediction mode of a current texture block is an inter mode, a depth block partitioning flag may be obtained, thereby enhancing coding efficiency.

Furthermore, it is required for depth-based block partitioning to generate prediction signals by respectively using different motion vectors of plural partitions of one coding block. Therefore, only when a partition mode of a current texture block is not a 2N×2N mode, a depth block partitioning flag may be obtained.

Referring to FIG. 9, a depth block partitioning flag may be obtained on the basis of a depth block partitioning availability flag (depth_based_blk_part_flag[layerId]), a prediction mode of a current texture block, and a partition mode of a current texture block at step S900.

As described above, the depth block partitioning availability flag may indicate whether or not depth-based block partitioning is used in at least one slice or coding block related to a layer ID layerId. For example, when a value of a depth block partitioning availability flag is 1, depth-based block partitioning may be used in at least one slice or coding block related to a relevant layer. When a value of a depth block partitioning availability flag is 0, depth-based block partitioning may not be used in all slices or coding blocks related to a relevant layer. Accordingly, only when a value of a depth block partitioning availability flag is 1, a depth block partitioning flag may be obtained.

In the meantime, in the same manner as shown in FIG. 7, only when a prediction mode of a current texture block is an inter mode, a depth block partitioning flag may be obtained, thereby enhancing coding efficiency.

Furthermore, only when a current texture block is not encoded in square shape partition (for example, a partition mode of a current texture block is not a 2N×2N mode or an N×N mode), a depth block partitioning flag may be obtained.

INDUSTRIAL APPLICABILITY

The present invention is industrially applicable in the industry field of coding a video signal.

The invention claimed is:

1. A method of decoding a multi-view video signal, the method comprising:
  determining a prediction mode of a current texture block;
  determining a partition mode of the current texture block when the current texture block is a block encoded in an inter mode;
  obtaining a motion vector of each partition based on the partition mode; and
  performing inter prediction on the current texture block by using the motion vector through depth-based block partitioning on the basis of a depth block partitioning flag when the partition mode of the current texture block is either an 2N×N or an N×2N mode,
  wherein when the depth block partitioning flag indicates that the inter prediction on the current texture block is performed through the depth-based block partitioning, a partition pattern of a depth block relating to the current texture block is derived by comparison between a reconstructed depth value of the depth block and a predetermined threshold value, and
  wherein the predetermined threshold value is an average value of samples positioned at corners of the depth block.

2. The method of claim 1, wherein the performing of inter prediction comprises:
  generating a first prediction block of the current texture block by using a motion vector of a first partition of the current texture block, and generating a second prediction block of the current texture block by using a motion vector of a second partition of the current texture block; and
  generating a final prediction block by combining the first prediction block and the second prediction block depending on a partition pattern of a depth block relative to the current texture block.

3. The method of claim 2, wherein the partition pattern of the depth block is divided into a first region and a second region on the basis of the comparison between the reconstructed depth value of the depth block and the predetermined threshold value,
  wherein, the first region is a region composed of samples having depth values larger than the predetermined threshold value, and the second region is a region composed of samples having depth values smaller than the predetermined threshold value.

4. An apparatus for decoding a multi-view video signal, the apparatus comprising:
   an entropy decoding unit determining a prediction mode of a current texture block, and determining a partition mode of the current texture block when the current texture block is a block encoded in an inter mode; and
   an inter-prediction unit obtaining a motion vector of each partition based on the partition mode, and performing inter prediction on the current texture block by using the motion vector through depth-based block partitioning on the basis of a depth block partitioning flag when the partition mode of the current texture block is either a 2N×N or an N×2N mode,
   wherein when the depth block partitioning flag indicates that the inter prediction on the current texture block is performed through the depth-based block partitioning, a partition pattern of a depth block relating to the current texture block is derived by comparison between a reconstructed depth value of the depth block and a predetermined threshold value, and
   wherein the predetermined threshold value is an average value of samples positioned at corners of the depth block.

5. The apparatus of claim 4, wherein the inter-prediction unit generates a first prediction block of the current texture block by using a motion vector of a first partition of the current texture block, generates a second prediction block of the current texture block by using a motion vector of a second partition of the current texture block, and generates a final prediction block by combining the first prediction block and the second prediction block depending on a partition pattern of a depth block relative to the current texture block.

6. The apparatus of claim 5, wherein the partition pattern of the depth block is divided into a first region and a second region on the basis of the comparison between the reconstructed depth value of the depth block and the predetermined threshold value,
   wherein the first region is a region composed of samples having depth values larger than the predetermined threshold value, and the second region is a region composed of samples having depth values smaller than the predetermined threshold value.

7. A method of encoding a multi-view video signal, the method comprising:
   encoding a prediction mode of a current texture block;
   encoding a partition mode of the current texture block when the current texture block is a block encoded in an inter mode;
   obtaining a motion vector of each partition based on the partition mode; and
   performing inter prediction on the current texture block by using the motion vector through depth-based block partitioning on the basis of a depth block partitioning flag when the partition mode of the current texture block is either a 2N×N or an N×2N mode,
   wherein when the depth block partitioning flag indicates that the inter prediction on the current texture block is performed through the depth-based block partitioning, a partition pattern of a depth block relating to the current texture block is derived by comparison between a reconstructed depth value of the depth block and a predetermined threshold value, and
   wherein the predetermined threshold value is an average value of samples positioned at corners of the depth block.

8. The method of claim 7, wherein the performing of inter prediction comprises:
   generating a first prediction block of the current texture block by using a motion vector of a first partition of the current texture block, and generating a second prediction block of the current texture block by using a motion vector of a second partition of the current texture block; and
   generating a final prediction block by combining the first prediction block and the second prediction block depending on a partition pattern of a depth block relative to the current texture block.

9. The method of claim 8, wherein the partition pattern of the depth block is divided into a first region and a second region on the basis of the comparison between the reconstructed depth value of the depth block and the predetermined threshold value,
   wherein the first region is a region composed of samples having depth values larger than the predetermined threshold value, and the second region is a region composed of samples having depth values smaller than the predetermined threshold value.

10. An apparatus for encoding a multi-view video signal, the apparatus comprising:
    an entropy encoding unit encoding a prediction mode of a current texture block, and encoding a partition mode of the current texture block when the current texture block is a block encoded in an inter mode; and
    an inter-prediction unit obtaining a motion vector of each partition based on the partition mode, and performing inter prediction on the current texture block by using the motion vector through depth-based block partitioning on the basis of a depth block partitioning flag when the partition mode of the current texture block is either a 2N×N or an N×2N mode,
    wherein when the depth block partitioning flag indicates that the inter prediction on the current texture block is performed through the depth-based block partitioning, a partition pattern of a depth block relating to the current texture block is derived by comparison between a reconstructed depth value of the depth block and a predetermined threshold value, and
    wherein the predetermined threshold value is an average value of samples positioned at corners of the depth block.

11. The apparatus of claim 10, wherein the inter-prediction unit generates a first prediction block of the current texture block by using a motion vector of a first partition of the current texture block, generates a second prediction block of the current texture block by using a motion vector of a second partition of the current texture block, and generates a final prediction block by combining the first prediction block and the second prediction block depending on a partition pattern of a depth block relative to the current texture block.

12. The apparatus of claim 10, wherein the partition pattern of the depth block is divided into a first region and a second region on the basis of the comparison between the reconstructed depth value of the depth block and the predetermined threshold value,
    wherein, the first region is a region composed of samples having depth values larger than the predetermined threshold value, and the second region is a region composed of samples having depth values smaller than the predetermined threshold value.

* * * * *